United States Patent [19]

Chou

[11] Patent Number: 5,446,994
[45] Date of Patent: Sep. 5, 1995

[54] FLOWER POT WITH WATER SUPPLY REGULATING MEANS

[76] Inventor: Wen S. Chou, P.O. Box 82-144, Taipei, Taiwan

[21] Appl. No.: 331,716

[22] Filed: Oct. 31, 1994

[51] Int. Cl.6 ............................................. A01G 27/00
[52] U.S. Cl. ............................................. 47/81; 47/66
[58] Field of Search .................... 47/81 R, 66 D, 79 R

[56] References Cited

U.S. PATENT DOCUMENTS

| 1,400,628 | 12/1921 | Rudolph | 47/81 R |
| 4,067,143 | 1/1978 | Alwell | 47/81 R |
| 4,782,627 | 11/1988 | Hauk | 47/81 R |

FOREIGN PATENT DOCUMENTS

| 1005287 | 12/1951 | France | 47/81 R |
| 1447333 | 6/1965 | France | 47/81 R |
| 416625 | 7/1925 | Germany | 47/81 R |
| 17945 | of 1910 | United Kingdom | 47/66 D |
| 2133264 | 7/1984 | United Kingdom | 47/81 R |

Primary Examiner—Henry E. Raduazo
Attorney, Agent, or Firm—Alfred Lei

[57] ABSTRACT

A flower pot including a pot body having an annular water reservoir disposed at the top, a water supply regulator consisting of a base block disposed in the annular water reservoir, a water guiding strap having a leading end dipped in water in the annular water reservoir and an opposite end extended into the pot body to guide water from the annular water reservoir into the pot body by capillary action, and an adjusting block moved in a vertical sliding slot on the base block to adjust the elevation of the leading end of the water guiding strap in water; and a locating device fastened to the pot body to hold down the water guiding strap.

1 Claim, 7 Drawing Sheets

FLOWER POT WITH WATER SUPPLY REGULATING MEANS

BACKGROUND OF THE INVENTION

The present invention relates to flower pots, and relates more particularly to a flower pot which has a water supply regulator adjusted to guide water into the soil within a predetermined length of water supply time.

Figure 7:
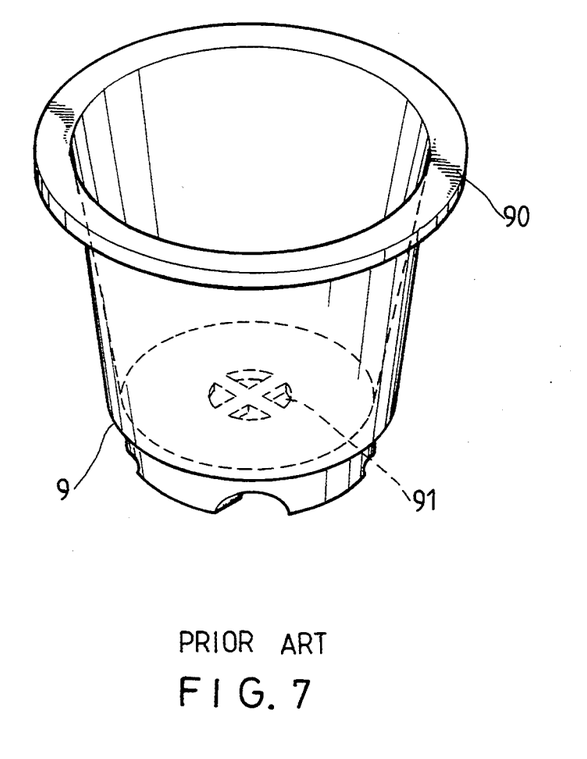
FIG. 7 shows still another structure of prior art flower pot.

A conventional flower pot, as shown in FIG. 7, is comprised of bowl-like pot body 9 molded from reclaimed plastics, having an outward top flange 90 convenient for the holding of the hands and a bottom through hole 91 for guiding excessive water out of the pot body 9. This flower pot has numerous drawbacks as outlined hereinafter.

A) Water must be frequently supplied to the soil in the pot body for absorption by the pot plants. However, it is difficult to know if the moisture in the soil has been maintained at the optimum level. Excessive water supply will damage the roots of the pot plants. Insufficient water supply cannot satisfy the need of the pot plants.

B) Because of the heavy weight of the soil and the pot plants carried in the pot body, the outward top flange 90 of the pot body 9 will be damaged easily during the transportation of the flower pot.

C) Ants can easily move over the pot body into the soil to make caves for living, causing troubles in planting.

D) Water tends to drain out of the through hole 91 on the bottom of the pot body 9 to waste water supply and to pollute the surroundings, more particularly when sandy soil is used.

E) When the pot plants are to be removed from the pot body for a transplantation, it is difficult to separate the soil from the pot body without damaging the pot plants.

FIGS. 6A, 6B, 6C and 6D show another structure of flower pot according to the prior art. The pot body 8 is made hollow, comprising a water reservoir 80, a water outlet 83 communicated between the water reservoir 80 and the inside space of the pot body 8, a water filling hole 81 and an air vent 82 disposed at two opposite locations and respectively communicated with the water reservoir 80 at the top. This structure of flower pot is still not satisfactory in function. One drawback of this structure of flower pot is that the water reservoir 80 of the pot body 8 cannot be molding through a single mold, thereby causing the manufacturing cost of the flower pot high. Another drawback of this structure of flower pot is that water is difficult to be filled into the water reservoir 80 through the water filling hole 81, and a big quantity of water will be wasted during the filling. Still another drawback of this structure of flower pot is that it cannot stop vermin from entering the soil in the pot body. A yet further drawback of this structure of flower pot is that the pot plants will be damaged easily when they are to be transplanted.

Figure 5A:
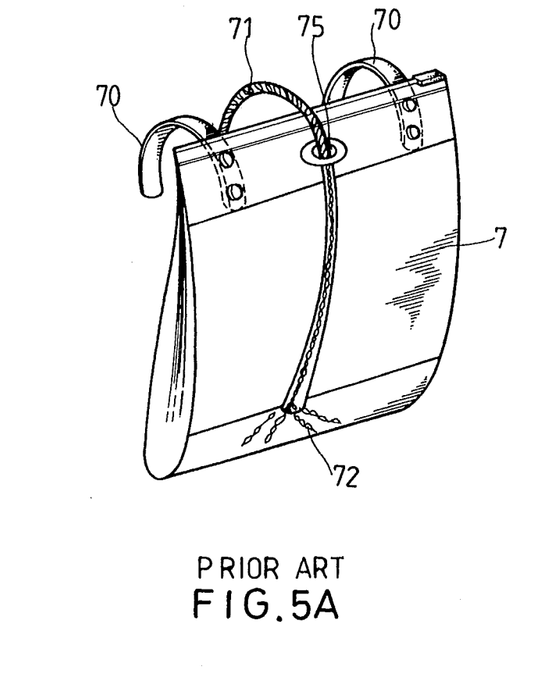
FIG. 5A shows a prior art flower pot.
Figure 5B:
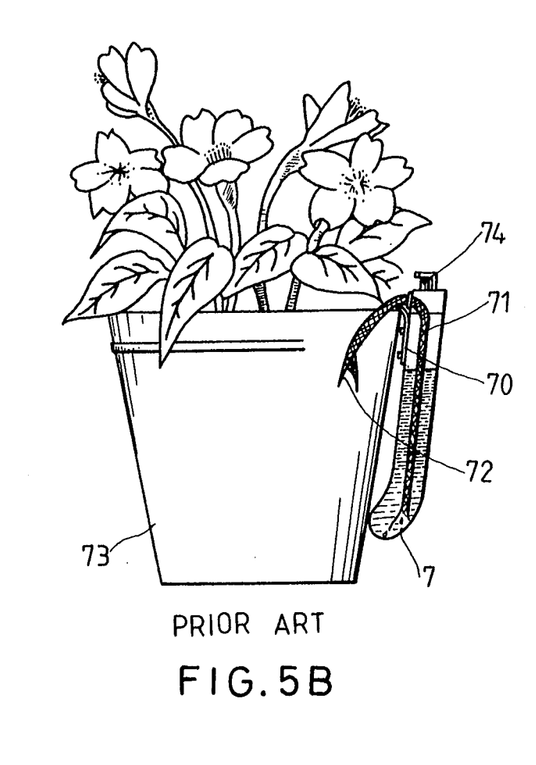
FIG. 5B shows an application of the prior flower pot.
Figure 6A:
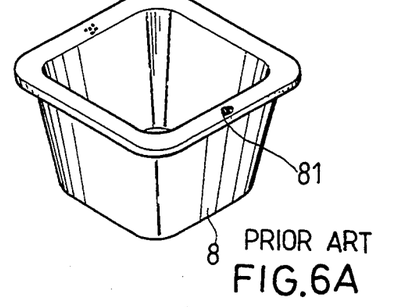
FIGS. 6A, 6B, 6C and 6D show another structure of prior art flower pot.
Figure 6B:
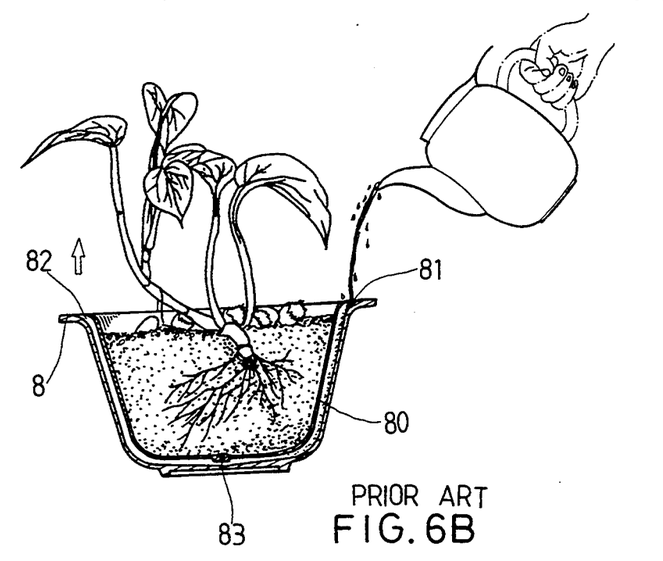
Figure 6C:
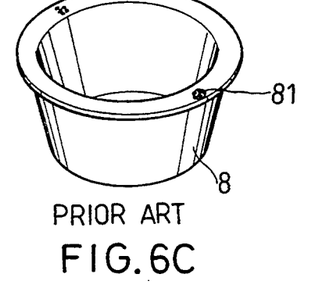
Figure 6D:
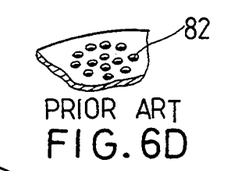

FIGS. 5A and 5B show still another structure of flower pot according to the prior art. This structure of flower pot comprises a pot body 73, and a water supply container 7 hung on the pot body 73 on the outside to supply water to the soil in the pot body. The water supply container 7 comprises a plurality of hooks 70 hooked on the topmost edge of the pot body 73, a water filling hole 75, a cap 74 fastened to the water filling hole 75, a plastic tube 71, and a cotton core 72 inserted in the plastic tube 71 for delivering water from the water supply container 7 to the soil in the pot body 73, a water filling hole 75. This structure of flower pot is still not satisfactory in function. While filling water into the water supply container 7, the cap 74 must be removed. The small diameter of the water filling hole 75 makes the filling of water difficult. Similar to the aforesaid prior art flower pots, this structure of flower pot cannot stop vermin from entering the soil in the pot body. Furthermore, the pot plants will be damaged easily when they are to be transplanted.

SUMMARY OF THE INVENTION

The present invention has been accomplished to provide a flower pot which eliminates the aforesaid drawbacks. It is one object of the present invention to provide a flower pot which automatically guides water into the soil of the pot body. It is another object of the present invention to provide a flower pot which stops vermin from entering the pot body. It is still another object of the present invention to provide a flower pot which permits the pot plants to be conveniently removed from the pot body for a transplantation without causing a damage. According to the preferred embodiment of the present invention, the flower pot comprises a pot body having an annular water reservoir disposed at the top; a water supply regulator consisting of a base block disposed in the annular water reservoir, a water guiding strap having a leading end dipped in water in the annular water reservoir and an opposite end extended into the pot body to guide water from the annular water reservoir into the pot body by capillary action, and an adjusting block moved in a vertical sliding slot on the base block to adjust the elevation of the leading end of the water guiding strap in water; a locating device fastened to the pot body to hold down the water guiding strap; and a dip consisting of a water tray disposed in the pot body to carry the soil and having a tubular guide rod extended out of a center through hole on the bottom of the pot body for guiding excessive water out of the pot body, a water filter element, and a cap fastened to the tubular guide rod to hold the water filter element on the inside. Because the water reservoir is an open type water reservoir disposed at the top around the soil in the pot body, vermin are prohibited from entering the soil in the pot body.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENTS

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 1:
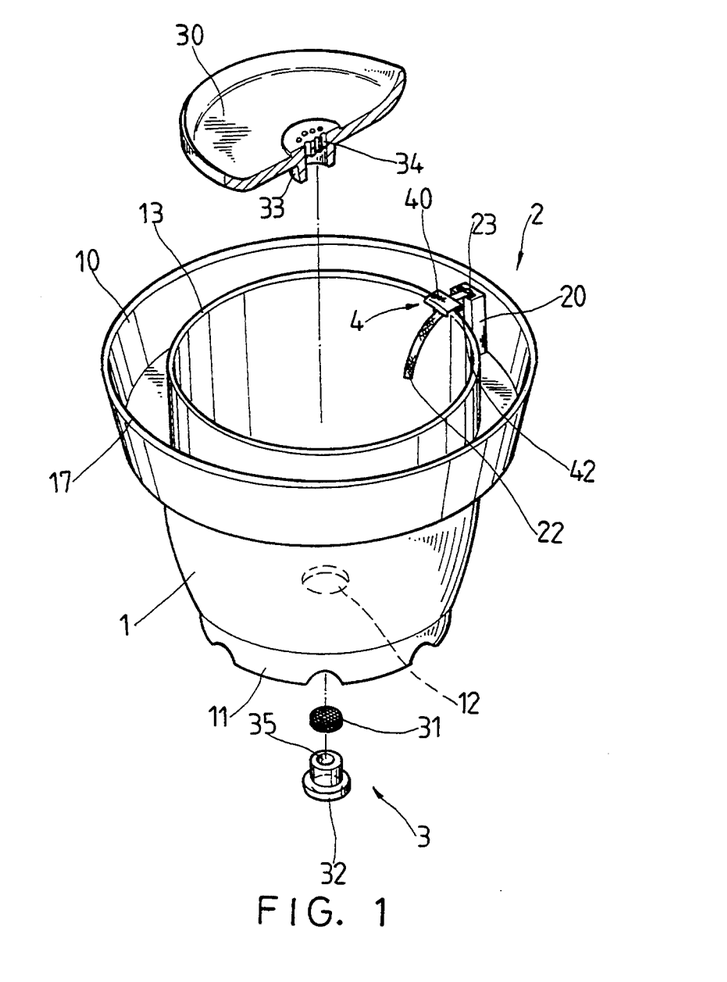
FIG. 1 shows a flower pot according to the preferred embodiment of the present invention.
Figure 2:
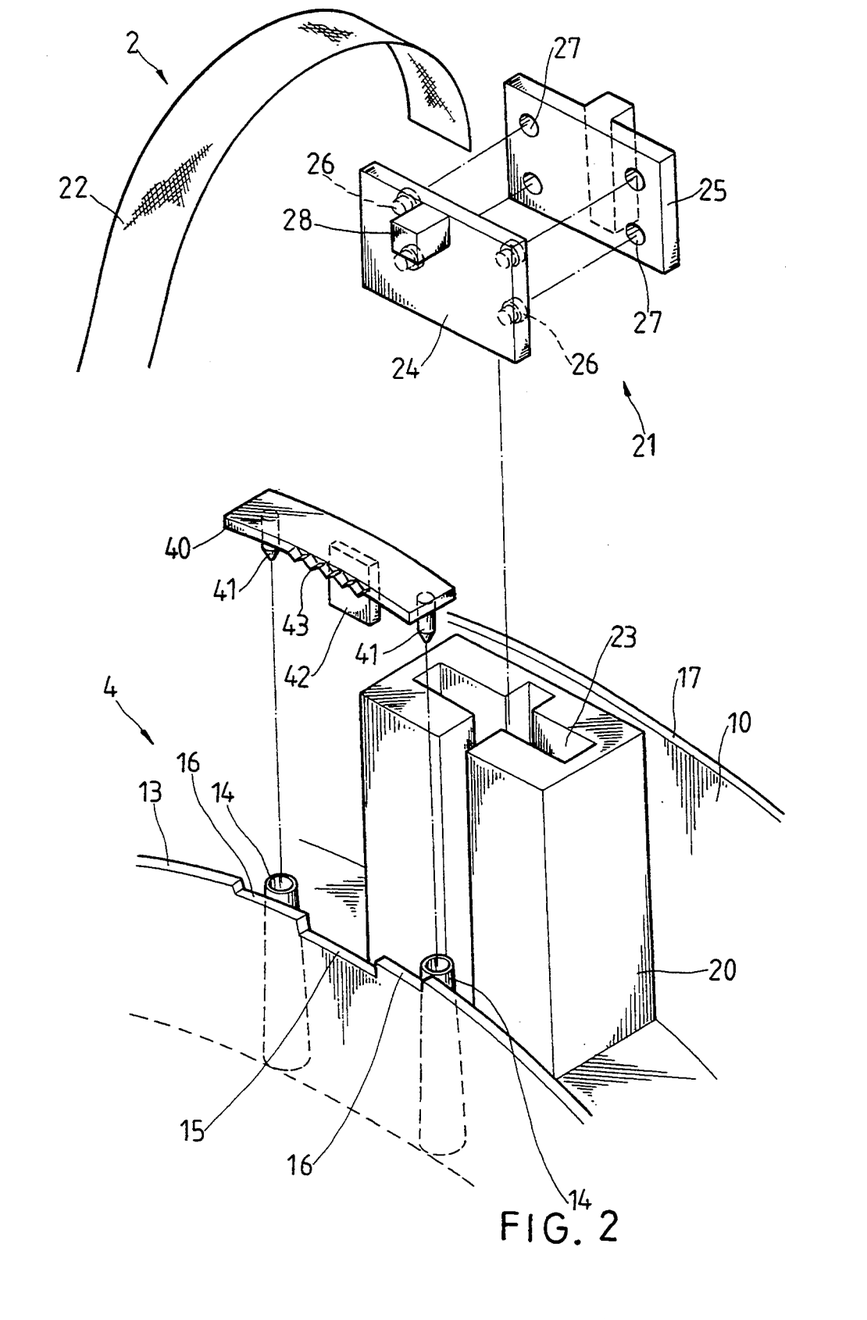
FIG. 2 is an exploded view in an enlarged scale of the water supply regulator of the flower pot of FIG. 1.

Referring to FIGS. 1 and 2, a flower pot in accordance with the present invention is generally comprised of a pot body 1, a water supply regulator 2, a drip 3, and a locating device 4.

The pot body 1 comprises an annular inner wall 13 and an annular outer wall 17 disposed at the top, an annular water reservoir 10 defined within the annular inner and outer walls 13 and 17, an annular bottom flange 11 extended downwards from the border of the bottom (not shown) thereof, a center through hole 12 through the bottom, a pair of axle housings 14 vertically disposed inside the annular water reservoir 10, a locating groove 15 made on the annular inner wall 13 at the top, and two mounting grooves 16 made on the annular inner wall 13 at the top and spaced by the locating groove 15.

The water supply regulator 2 comprises a base block 20, an adjusting block 21, and a water guiding strap 22. The base block 20 is disposed in the annular water reservoir 10, defining a vertical sliding slot 23. The adjusting block 21 is formed of an outer plate 24 and an inner plate 25, and moved in the sliding slot 23. The inner plate 25 comprises a plurality of pin holes 27. The outer plate 24 comprises a plurality of pins 26 raised from one side thereof and respectively fitted into the pin holes 27, and a pull rod 28 raised from an opposite side thereof and extended out of the sliding slot 23. Through the pull rod 28, the adjusting block 21 can be conveniently moved in the sliding slot 23 vertically.

The drip 3 comprises a dish-like water tray 30 fitting over the inside bottom of the pot body 1, a water filter element 31, and a cap 32. The tray 30 is disposed inside the pot body 1, having a tubular guide rod 33 at the bottom extended out of the center through hole 12 and a plurality of through holes 34 in the center for guiding water into the tubular guide rod 33, the water filter element 31 is inserted in the tubular guide rod 33. The cap 32 is fastened to the tubular guide rod 33 to hold the water filter element 31 inside the tubular guide rod 33, having a center through hole 35 for guiding water out of the tubular guide rod 33.

The locating device 4 comprises a locating plate 40 having a pair of downward mounting rods 41 respectively fitted into the axle housings 14, a downward stop block 41 stopped against the annular inner wall 13 at an outer side, and a series of downward holding-down teeth 43 matching with the locating groove 15 to hold down the water guiding strap 22.

Figure 3:
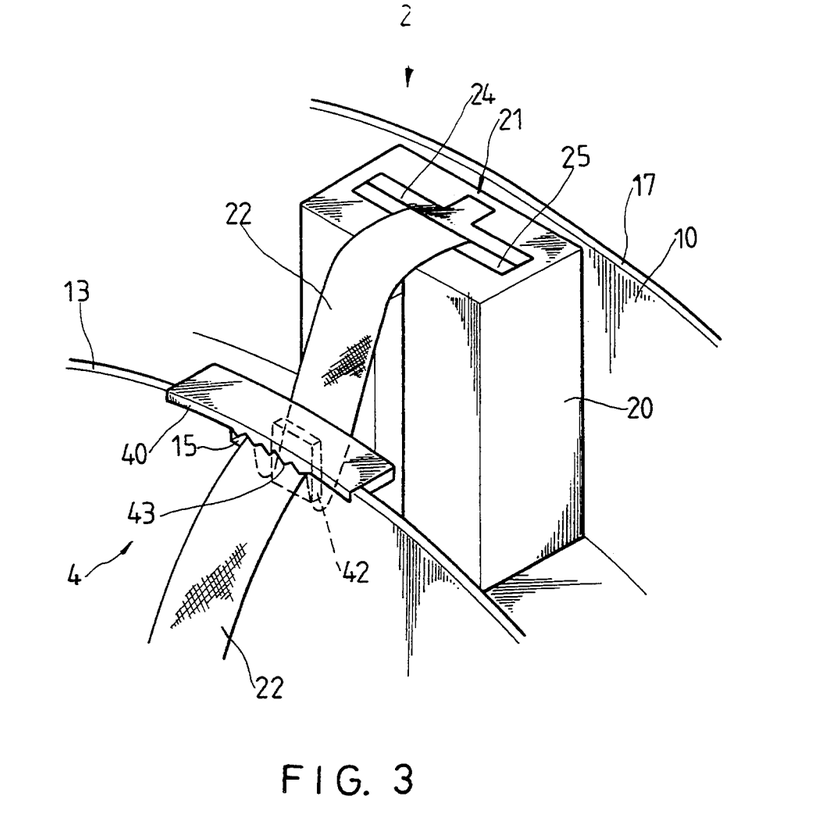
FIG. 3 is an installed view of the water supply regulator of FIG. 2.

The assembly process of the flower pot is outlined hereinafter with reference to FIGS. 1, 2, and 3. When the water tray 30 is put in the pot body 1, the tubular guide rod 33 of the water tray 30 is inserted into the center through hole 12, then the cap 32 is fastened to the tubular guide rod 33 outside the pot body 1 to hold the water filter element 31 inside the tubular guide rod 33. Then, the outer plate 24 and the inner plate 25 are connected together by fitting the pins 26 into the pin holes 27, permitting one end of the water guiding strap 22 to be retained between the outer and inner plates 24 and 25. Then, the adjusting block 21 is inserted into the sliding slot 23 of the base block 20. Therefore, the water supply regulator 2 is assembled. When the water supply regulator 2 is assembled, it is put in the annular water reservoir 10 of the pot body 1. Then, the locating plate 40 is fastened to the mounting grooves 16 of the annular inner wall 13 of the pot body 1 by fitting the downward mounting rods 41 into the axle housings 14, permitting the water guiding strap 22 to be extended into the pot body 1 and retained in place by the downward stop block 42 and the holding-down teeth 43.

Figure 4:
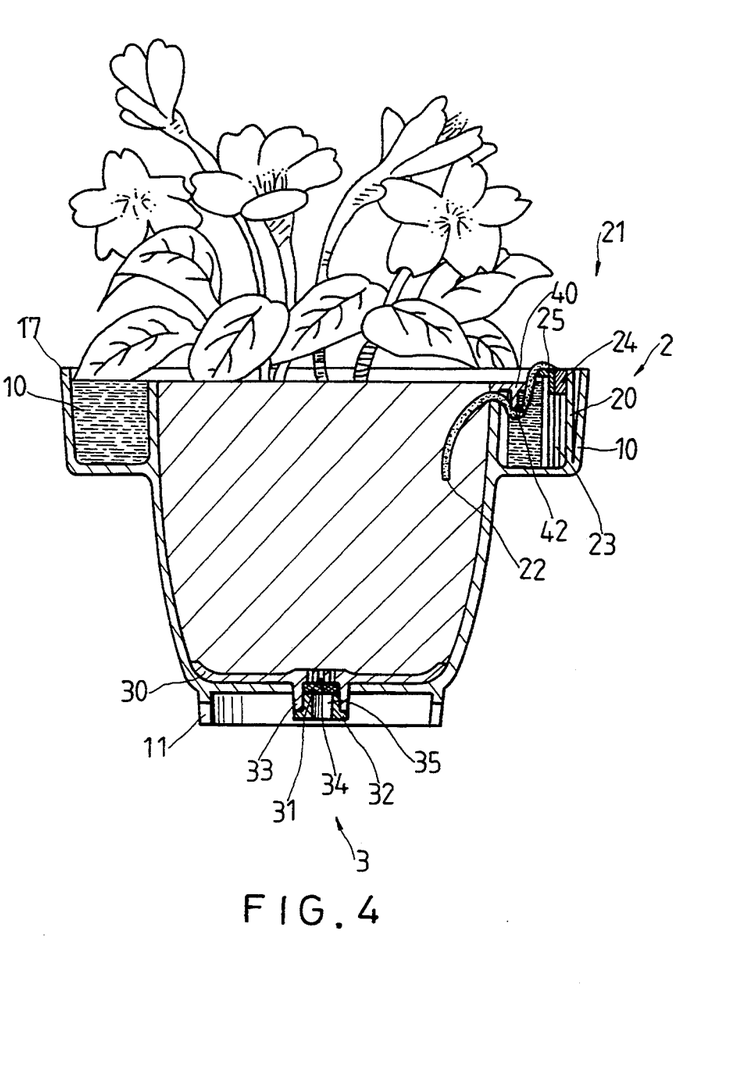
FIG. 4 is a sectional assembly view of the flower pot of the present invention.

Referring to FIG. 4, when plants and soil are put in the pot body 1, water is filled in the annular water reservoir 10. Therefore, water is guided into the pot body 1 by the water guiding strap 22 by means of capillary action, to moisten the soil in the pot body 1. Fertilizers can be put in the annular water reservoir 10 and mixed with water so that it can be further carried into the soil in the pot body 1 by water. By means of the pull rod 28, the elevation of the adjusting block 21 can be adjusted according to the measurement of the graduations (not shown) marked on the base block 20, and therefore the water supply time is controlled (When the adjusting block 21 is moved to a lower elevation, the leading end of the water guiding strap 22 is dipped in water deeper, and therefore the water supply time is relatively extended). When excessive water is added to the soil in the pot body 1, it will be guided out of the pot body 1 through the through holes 34 of the water tray 30, the tubular guide rod 33, the water filter element 31, and the center through hole 35 of the cap 32. Therefore, the moisture in the soil is maintained stable. The annular water reservoir 10 can also be used as a small aquarium to keep living fish, water animals and plants. If the pot plants are to be removed from the pot body 1 for a transplantation, the cap 32 and the water filter element 31 are removed from the water tray 30, then push the tubular guide rod 33 inwards, and therefore the water tray 30 with the soil and the pot plants can be conveniently removed from the pot body 1 for a transplantation.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A flower pot comprised of a pot body having a bottom wall and a downward annular bottom flange extended from the border of the bottom wall and a center through hole on the bottom wall, a water supply regulator, a drip fastened to the center through hole on said pot body for guiding excessive water out of said pot body, and a locating device, wherein:

said pot body comprises an annular top inner wall and an annular top outer wall, an annular water reservoir defined within said annular top inner wall and said annular top outer wall to hold water, a pair of axle housings vertically disposed inside said annular water reservoir, a locating groove made on said annular top inner wall, and two mounting grooves made on said annular top inner wall and spaced by said locating groove;

said water supply regulator comprises a base block disposed inside said water reservoir and having a vertical sliding slot, an adjusting block vertically moved in said vertical sliding slot and adjustably retained at a desired elevation, and a water guiding strap having one end fixed to said adjusting block and dipped in water in said water reservoir and an opposite end extended over said locating groove and said mounting grooves into said pot body to guide water from said water reservoir into said pot body by capillary action;

said locating device comprises a locating plate fastened to said annular top inner wall to hold down said water guiding strap, said locating plate comprising two downward mounting rods respectively fitted into said axle housings, a downward stop block stopped against said annular top inner wall at an outer side over said water guiding strap, and a series of downward holding-down teeth pressed on said water guiding strap against said locating groove.

* * * * *